United States Patent Office 3,555,008
Patented Jan. 12, 1971

3,555,008
PREPARATION OF GELATINIZED CARBOXY-ALKYL STARCH DERIVATIVES
Richard Shaw Johnson, Wirral, England, assignor to Lever Brothers Company, New York, N.Y., a corporation of Maine
No Drawing. Filed Oct. 12, 1967, Ser. No. 674,718
Claims priority, application Great Britain, Oct. 13, 1966, 45,771/66
Int. Cl. C08b 19/01
U.S. Cl. 260—233.3
2 Claims

ABSTRACT OF THE DISCLOSURE

This invention relates to an improved process for the preparation of gelatinised carboxyalkyl derivatives of starch, wherein ungelatinised starch granules are reacted with an unsaturated ester at a strictly controlled pH of 9.5–10.5. The ungelatinised starch derivative thus obtained is separated from the neutralised reaction slurry and subsequently gelatinised and dried, preferably by application as an aqueous suspension to the outer surface of a heated, rotating drum.

---

This invention relates to a process for the preparation of certain carboxyalkyl derivatives of starch. In particular, the invention is concerned with an improved process for the preparation of gelatinised carboxyalkyl derivatives of starch based on the reaction between starch and an unsaturated ester under strictly controlled conditions of pH.

The reaction between starch and an unsaturated ester in aqueous alkaline medium and in the presence of a gelatinisation inhibitor has already been proposed but the carboxyalkyl derivatives obtained from this reaction have hitherto varied considerably in their ability to form useful gels when dispersed in cold water after gelatinisation, particularly after drum-drying. It was difficult to ensure that the gelatinised carboxyalkyl derivative of starch would always disperse in cold water to give a useful adhesive paste. A useful paste is one which is smooth, viscous and short. It should also be stable and capable of being further diluted with water without losing stability.

In this specification the terms "long," "short," and "stringiness," as applied to starch pastes, have specialised meaning. A starch paste is said to be "long" if it is elastic in nature, such that when a glass rod is withdrawn from the paste, it carries a thin strip of the paste with it. A "short" paste on the other hand is non-elastic in nature and a glass rod withdrawn from such paste would only carry a blob of the paste with it. "Stringiness" merely implies a severely "long" cohesive paste.

According to the invention there is provided a process for the preparation of gelatinised carboxyalkyl derivatives of starch which comprises the steps of reacting an aqueous suspension of ungelatinised starch granules in the presence of a gelatinisation inhibitor and at a pH of between 9.5 and 10.5 with an unsaturated ester of general formula

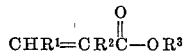

wherein $R^1$ is hydrogen or a methyl group,
$R^2$ is a hydrogen atom, a methyl group, a carboxymethyl group or a $C_1$–$C_4$ alkoxycarbonyl methyl group, and
$R^3$ is a $C_1$–$C_4$ alkyl group, neutralising the reaction slurry of the non-gelatinised carboxyalkyl starch derivative, separating the starch derivative from the aqueous slurry and subsequently gelatinising and drying the separated material.

The carboxyalkyl starch derivative may be gelatinised either prior to drying or simultaneously with drying by heating it in the presence of water to a temperature higher than that of the gelatinising point of the starch derivative. For example, the gelatinisation may be accomplished by drum-drying.

In this process any of the commercially available starches, such as wheat, farina, rice or maize starch can be used. Modified starches, as for instance, esterified starches or etherified starches (with the exception of hydroxyalkyl starches) may also be used providing that they retain a substantial degree of their granular amylaceous structure and excessive alkalinity during their preparation has been avoided.

Suitable unsaturated esters for use in this process include the methyl, ethyl, n:propyl, iso-propyl, n:butyl, iso-butyl or tert. butyl esters of acrylic acid, methacrylic acid, crotonic acid or itaconic acid. Preferred esters for this process are methyl acrylate, ethyl acrylate, iso-propyl acrylate, n:butyl acrylate, tert. butyl acrylate, methyl methacrylate, ethyl methacrylate, iso-propyl methacrylate, n:butyl methacrylate or tert. butyl methacrylate. Particular preferred esters are methyl acrylate, ethyl acrylate, n:butyl acrylate and methyl methacrylate.

In order to ensure that the starch derivative and the starch remain, through the reaction, in an essentially ungelatinised form it is necessary that a gelatinisation inhibitor be employed. The gelatinisation inhibitor is a water soluble, neutral, inorganic alkali metal salt. Sodium sulphate, sodium chloride, sodium phosphate, sodium nitrate or the corresponding potassium salts are suitable inhibitors. All of these salts should be free of heavy metals. An aqueous solution of the inhibitor which is essentially saturated at the temperature of the reaction should be prepared and the starch suspended in it.

After the required amount of gelatinisation inhibitor is added to the water, the resulting mixture is vigorously agitated while the granules of ungelatinised starch are added. The temperature of the resulting aqueous suspension is raised to an operating temperature of 30–55° C. The preferred operating temperature range is 35–40° C. During continued vigorous agitation, the requisite amount of unsaturated ester is added. Sufficient aqueous alkali solution is now added to bring the pH of the reaction mixture to 9.5–10.5. pH measurements and consequential adjustments of pH to 9.5–10.5 can then be made at frequent intervals, manually or by automatic devices. Providing the necessity of strict pH control is complied with, it is also possible to add the unsaturated ester to the reaction mixture in portions over a period of time. The reaction is considered to be complete when no appreciable change of pH occurs over a period of 30 minutes.

Although aqueous solutions of sodium hydroxide or potassium hydroxide are preferred for raising the pH of the reaction mixture to 10.5 aqueous solutions of the corresponding carbonates or aqueous quaternary ammonium hydroxides are also suitable. To facilitate the pH control of this reaction it is preferable to use these aqueous alkali solutions at a strength no greater than 20% w./v. and to provide efficient stirring.

When the reaction is judged to be complete the pH of the reaction slurry is adjusted to neutrality by addition of the requisite amount of a dilute acid, such as hydrochloric or sulphuric acid. The starch derivative is then separated from the water and water soluble by-products and impurities by filtration or centrifugation of the aqueous reaction slurry. The product which is obtained is reslurried in water and again filtered or centrifuged. This purification process is repeated until the product is substantially free from inorganic salts. A total of 2–3 washes, each with an amount of water equal to 3 times the weight of starch, is usually sufficient.

If neutralisation of the reaction slurry is not carried out before separation of the water soluble products, gelatinisation is liable to occur due to the removal of the gelatinisation inhibitor while alkali may still be present on the surface of the starch derivative granules. An optimum pH after neutralisation of the aqueous reaction slurry will be between 6 and 8.0.

The purified filter cake of ungelatinised carboxyalkyl starch derivative thus obtained is now gelatinised and dried. If desired the ungelatinised starch derivative may be gelatinised before drying or preferably simultaneously with the drying stage. Gelatinisation is characterised by a loosening of the structure of the starch granules. This loosening is most readily accomplished by heating the granules, preferably in the presence of a limited amount of water, and, if necessary, a limited amount of alkali (not to a pH higher than 11.0) to a certain temperature level which is at or above that which is known as the gelatinising point of the starch or starch derivative under test. When the gelatinisation and drying are carried out simultaneously it is convenient to form a slurry with a concentration of about 30% solids. The amount of alkali added, if any, should be limited so as to avoid exceeding a slurry pH of about 11. If a product with high alkalinity is required the slurry should be drum dried immediately after the addition of alkali. Such a product is most suitable for dispersing in water of a high hardness. The pH of the slurry should be adjusted to between 8.5 and 9.0 if the product is to be used in water of a low hardness.

Simultaneous gelatinisation and drying is most readily obtained by applying the filter cake of the starch derivative as an aqueous dispersion to the outer surface of a rotating drum heated to a temperature of between 100° and 180° C. The mass of applied starch derivative is pressed out to form a thin layer on the surface of the rotating drum so that drying and gelatinisation is facilitated. The dried and gelled product is removed as a thin film or flakes. This product can be ground to the desired flake size. The material thus obtained is readily dispersible in cold water.

The hydration and solution properties of the drum dried carboxyalkyl starch derivative finally isolated, show a clear gradation according to the pH under which the reaction between the starch granules and the unsaturated ester is carried out. At pH 9.5 and below the properties of the starch derivatives are akin to unmodified starch whilst at pH 11 and above an aqueous dispersion of the drum dried carboxyalkyl derivative is "long" and "stringy." The product obtained when the reaction is carried out at pH 9.5 to 10.5 gives a satisfactory smooth, short paste when dispersed in water.

The properties of the drum dried starch derivative are also, to some extent dependent on the degree of carboxyalkyl substitution of the starch. The degree of substitution can vary from 0.01 to 0.10 without affecting the advantageous properties of the starch derivative. When the product is to be used in water of a low to medium range of hardness it is preferred to carry out the carboxyalkylation of the starch until it is substituted to a degree of 0.025–0.04. When the amount of water hardness is high then the degree of substitution is preferably increased to a value of 0.07 to 0.08.

The invention is now further illustrated by reference to the following examples.

EXAMPLE 1

36½ lbs. of anhydrous sodium sulphate were added to 196 lbs. of water contained in a 30 gallon glass lined reaction vessel.

90 lbs. of farina starch (14% moisture) were slowly added to this well agitated mixture. The temperature of the resulting reaction mixture was brought to 45° C.

5 lbs. of ethyl acrylate were fed into the reaction mixture and with continuous agitation the pH adjusted to 10.5 by addition of the requisite amount of aqueous alkali. The aqueous alkali was prepared by dissolving 2 lbs. of sodium hydroxide in 8 lbs. of water and cooling the resulting solution to room temperature.

The pH of this mixture was then taken at 10 minute intervals with consequential readjustment of the pH to 10.5 when required, by addition of further amounts of the aqueous sodium hydroxide solution. The reaction was considered to be complete after 7 to 8 hours, when no appreciable change in pH had taken place over a period of 30 minutes. The pH of the aqueous slurry thus formed was adjusted to 7.0 by the addition of dilute hydrochloric acid. The neutralised slurry was then centrifuged and the resulting filter cake reslurried in 224 lbs. water. This filtering and reslurrying process was repeated and after final filtration approximately 112 lbs. of filter cake (with about 45% moisture content) was obtained. This filter cake was slurried in 210 lbs. water. The pH was adjusted to pH 8.5–9 and the slurry drum dried at 120° C. to yield a product which gave a satisfactory short, viscous paste when dispersed in cold water (12° hardness) at 5% w./v. concentration.

For comparison purposes further experiments were carried out in which aqueous alkali solution was added to further reaction mixtures prepared as described above.

In one experiment aqueous alkali solution was added at such a rate that during the whole period of the etherification reaction the pH never fell below 11.0. The resultant slurry was brought to pH 7.0 by addition of dilute hydrochloric acid, filtered and washed. The isolated material was drum dried at 120° C. to give a product which yielded an unsatisfactory "long" paste when dispersed in cold 12° water at 5% w./v. concentration.

In a further experiment the aqueous alkali solution was added at a rate sufficient only to maintain the reaction mixture at pH 9.0. After 8 hours, stirring was stopped and the resulting slurry was neutralised, filtered and washed. The isolated material was slurried at a pH of 8.5–9 and drum dried at 120° to give a product which had properties similar to unmodified starch in that it did not readily rehydrate to a smooth gel and tended to retograde.

EXAMPLE 2

A reaction mixture consisting of

| | Lbs. |
|---|---|
| Anhydrous sodium sulphate | 36½ |
| Water | 196 |
| Farina starch | 90 |
| Methyl methacrylate | 5 | was prepared following the method given in Example 1. The temperature of the reaction mixture was adjusted to 45° C.

2 lbs. sodium hydroxide were dissolved in 8 lbs. water.

This solution was cooled to room temperature and added in portions to the stirred reaction mixture so that the pH was maintained between 10 and 10.5 throughout the reaction. After 8 hours stirring, the resulting slurry was neutralised to pH 7.0, filtered and washed. The material thus obtained was slurried at a pH of 8.5–9 and subsequently drum dried at 120° C. to give a product which yielded a satisfactory short, viscous paste when dispersed in cold water (12° hardness) at 5% w./v. concentration.

EXAMPLE 3

A reaction mixture consisting of

| | Lbs. |
|---|---|
| Anhydrous sodium sulphate | 36½ |
| Water | 196 |
| Farina starch | 90 |
| n:butylbutyl acrylate | 6.4 | was prepared following the method given in Example 1. The temperature of this reaction mixture was adjusted to to 45° C.

2 lbs. sodium hydroxide were dissolved in 8 lbs. water.

This solution was cooled to room temperature and added in portions to the stirred reaction mixture so that the pH was maintained between 10 and 10.5 throughout the reaction. After 8 hours stirring, the resulting slurry was neutralised to pH 7.0, filtered and washed. The material thus obtained was slurried at a pH of 8.5–9 and subsequently drum dried at 120° C. to give a product which yielded a satisfactory short, viscous paste when dispersed in cold water (12° hardness) at 5% w./v. concentration.

EXAMPLE 4

A reaction mixture consisting of

| | Lbs. |
|---|---|
| Anhydrous sodium sulphate | 36½ |
| Water | 196 |
| Farina starch | 90 |
| Methyl acrylate | 4.3 | was prepared following the method given in Example 1. The temperature of this reaction mixture was adjusted to 45° C.

2 lbs. sodium hydroxide were dissolved in 8 lbs. water.

This solution was cooled to room temperature and added in portions to the stirred reaction mixture so that the pH was maintained between 10 and 10.5 throughout the reaction. After 8 hours stirring, the resulting slurry was neutralised to pH 7.0, filtered and washed. The material thus obtained was slurried at a pH of 11.0 and subsequently drum dried at 120° C. to give a product which yielded a satisfactory short, viscous paste when dispersed in cold water (30° hardness) at 5% w./v. concentration.

What is claimed is:

1. A process for the preparation of a gelatinized carboxyalkyl derivative of starch which consists essentially of the steps of:
   (a) forming an aqueous suspension of ungelatinized starch granules and a water-soluble, neutral, inorganic alkali metal salt at 30–55° C., said water-soluble, neutral, inorganic alkali metal salt being selected from the group consisting of sodium sulfate, sodium chloride, sodium phosphate, sodium nitrate, potassium sulfate, potassium chloride, potassium phosphate and potassium nitrate,
   (b) reacting said aqueous suspension with an ethylenically unsaturated ester of the general formula:

$$CHR^1=CR^2.CO—OR^3$$

in which $R^1$ is selected from the group consisting of hydrogen and a methyl group, $R^2$ is selected from the group consisting of hydrogen, a methyl group, a carboxymethyl group and a $C_1$–$C_4$ alkoxycarbonyl group, and $R^3$ is a $C_1$–$C_4$ alkyl group, to form a reaction slurry of a nongelatinized carboxyalkyl starch derivative, during step (b) the pH being maintained between about 9.5 to about 10.5 by the addition of an aqueous solution of an alkali,
   (c) neutralizing said reaction slurry,
   (d) separating said nongelatinized carboxyalkyl starch derivative from the reaction slurry, and
   (e) simultaneously gelatinizing and drying the separated nongelatinized carboxyalkyl starch derivative by application of an aqueous suspension of the said derivative, that has been brought to a pH between 8.5 and 11, to the outer surface of a rotating drum heated at a temperature between 100° and 180° C.

2. A process for the preparation of a gelatinized carboxyalkyl derivative of starch which consists essentially of the steps of:
   (a) forming an aqueous suspension of ungelatinized starch granules and a water-soluble, neutral, inorganic alkali metal salt of 30°–55° C., said water-soluble, neutral, inorganic alkali metal salt selected from the from the group consisting of sodium sulfate, sodium chloride, sodium phosphate, sodium nitrate, potassium sulfate, potassium chloride, potassium phosphate and potassium nitrate,
   (b) reacting said aqueous suspension with an ethylenically unsaturated ester of the general formula:

$$CHR^1=CR^2.CO—OR^3$$

in which $R^1$ is selected from the group consisting of hydrogen and a methyl group, $R^2$ is selected from the group consisting of hydrogen, a methyl group, a carboxymethyl group and a $C_1$–$C_4$ alkoxycarbonyl group, and $R^3$ is a $C_1$–$C_4$ alkyl group, to form a reaction slurry of a nongelatinized carboxyalkyl starch derivative, during step (b) the pH being maintained between about 9.5 to about 10.5 by the addition of an aqueous solution of an alkali,
   (c) neutralizing said reaction slurry,
   (d) separating said nongelatinized carboxyalkyl starch derivative from the reaction slurry, and
   (e) simultaneously gelatinizing and drying the separated nongelatinized carboxyalkyl starch derivative by application of an aqueous suspension of the said derivative, that has been brought to a pH between 8.5 and 9, to the outer surface of a rotating drum heated at a temperature between 100° and 180° C.

References Cited

UNITED STATES PATENTS

| 3,033,852 | 5/1962 | Paschall | 260—233.3 |
| 3,061,472 | 10/1962 | Brockway | 117—139.5 |
| 3,071,573 | 1/1963 | Taylor | 260—233.3 |
| 3,136,646 | 6/1964 | Elizer et al. | 106—210 |
| 3,377,302 | 4/1968 | Gugliemelli et al. | 260—17.4 |
| 3,438,970 | 4/1969 | Chamberlain et al. | 260—233.3 |

DONALD E. CZAJA, Primary Examiner

M. I. MARQUIS, Assistant Examiner

U.S. Cl. X.R.

260—233.5